June 20, 1967 W. E. FOSTER 3,326,301
FRONT-MOUNTED PLOW
Filed Sept. 22, 1964 4 Sheets-Sheet 1

INVENTOR.
WILLIAM E. FOSTER
BY
Lockwood, Woodard, Smith & Weikart
Attorneys

INVENTOR.
WILLIAM E. FOSTER

June 20, 1967  W. E. FOSTER  3,326,301

FRONT-MOUNTED PLOW

Filed Sept. 22, 1964  4 Sheets-Sheet 4

INVENTOR.
WILLIAM E. FOSTER
BY
Lockwood, Woodard, Smith & Weikart
Attorneys

3,326,301
FRONT-MOUNTED PLOW
William E. Foster, R.R. 6, Box 1038,
Kokomo, Ind. 46901
Filed Sept. 22, 1964, Ser. No. 398,232
9 Claims. (Cl. 172—280)

This invention relates to vehicle-carried implements, and more particularly, in the embodiment herein presented, to a novel front-mounted plow for a tractor.

Concepts of the present invention provide a novel and useful plow for front-mounting, effectively providing means for achieving more plowing effect than with rear-mounted plows, and requiring less power to provide any given number of plow blades, permitting advantageous plow arrangement and flexibility of operation by utilizing a front-mounted plow in combination with one or more rear plows. The front-mounted plow also eliminates side-draft of rear-mounted plows, apparently caused by a rear plow running somewhat out of line.

Other concepts of the invention provide a tractor-mounted plow permitting more ease in turning corners, even those with relatively small radius. More particularly, concepts of the invention provide for advantageous swing-ability of the plow-blade assembly with respect to the tractor; for steerability of the furrow wheel of the plow; provide for automatic following of the previous furrow; and for automatic control, by the plow, of the tractor itself.

Other concepts of the invention provide powered lifting and height-control of the plow-blade assembly; and for adjustment of the height of the furrow wheel with respect to the plow framing, thus permitting the framing to remain horizontal even though the furrow wheel is at a furrow-tracking lowered position with respect to the tractor.

These and other useful concepts, advantages, details, features, and objects of the present invention, providing in the overall a novel and advantageous front-mounted plow for a tractor, will be apparent in the following detailed description of an embodiment thereof which illustrates the many invention concepts, reference being had to the accompanying somewhat diagrammatic drawings, in which:

FIG. 7 is a view taken generally along section-lines 7—7 of FIG. 1 and FIG. 2, illustrating means for varying the height of the furrow wheel;

FIG. 8 is a detail cross-sectional view, taken generally along section-line 8—8 of FIG. 7;

*In general*

Figure 1:
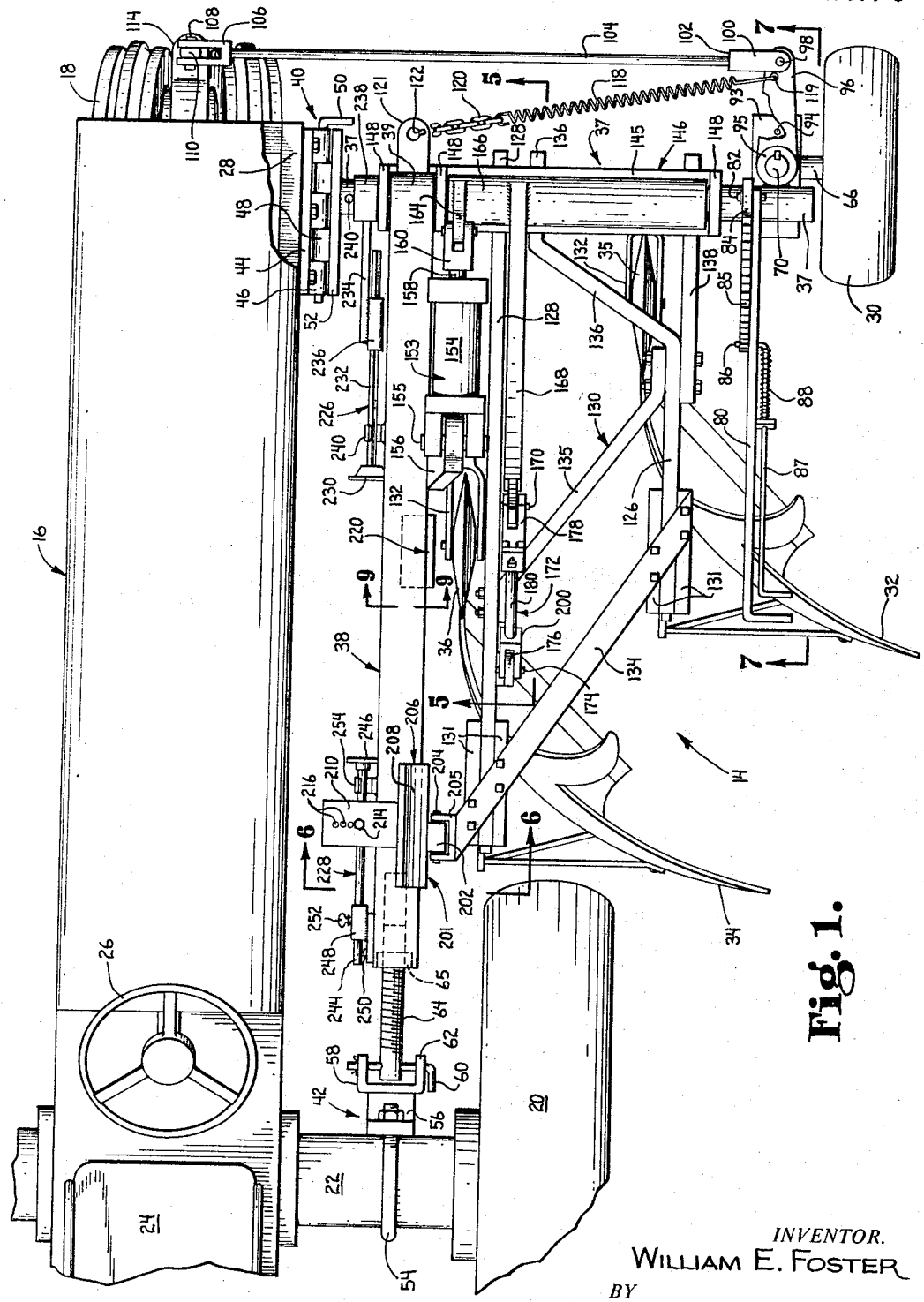
FIG. 1 is a plan view of a tractor provided with a front-mounted plow according to the invention.

As shown in the drawings, a front-mounted plow 14 illustrating concepts of the present invention is shown in connection with a tractor 16 of conventional type having front guide or steering wheels 18, rear driving wheels 20 carried on a rear axle 22, a driver's seat 24, steering wheel 26, and vehicle framing generally indicated by reference numeral 28.

According to concepts of the present invention, the plow 14 is provided for front-mounting for such a tractor, providing the several operational advantages set forth herein and others which are inherent.

Plow components most readily apparent in the drawings include a supporting or furrow wheel 30, outboard and inboard plow blades 32 and 34, each preceded by a ground-cutting disc 35 and 36, respectively, and plow framing generally comprising a main lateral plow supporting shaft-member 37 and main longitudinal plow support member 38, the latter being connected to lateral member 37 by a collar 39 which loosely surrounds arm 37.

*Mounting and support of plow 14*

The plow 14 is supported, in part, by the furrow wheel 30. It is supported also by the tractor 16, at a front mount 40 and a rear mount 42, these mounts 40 and 42 being now described in detail.

Front mount 40 (see FIGS. 1 and 2) permits the lateral plow-support arm 37 to swing in a vertical, transverse plane with respect to the tractor 16, thus accommodating similar swinging or lifting of the plow 14 itself, as may be needed during operation of the plow. As shown, the front mount 40 is of a hinge-type, including a tractor bracket 44 secured to tractor framing 28, and having straps or leaves 46 which co-operate with leaves 48 on the plow 14 to provide a longitudinally-extending horizontal bore and receiving a removable hinge-pin 50.

The advantageous relative rotation, permitted by pin 50 in leaves 46 and 48, permits the relative swinging of the plow 14 and tractor 16. The leaves 48 of this mount 40 are shown as carried on a bracket 52, which is supportingly connected to lateral plow support 37.

Rear mount 42 (FIGS. 1 and 3) permits the longitudinal plow-support member 38 to swing in a vertical, fore-and-aft plane with respect to the tractor 16, and also permits rotation of the member 38, thus accommodating similar lifting or swinging of the plow 14 itself. As shown, the rear mount 42 includes a strap 54 shown as formed from rod stock into a general C-shape, and passing over and around the rear axle 22. To strap 54 is bolted a bracket 56 the front of which carries a yoke 58; and a removable pin 60 supportingly passes through the yoke-arms 62 and through a longitudinal support bar 64 supportingly carried by the longitudinal plow support member 38.

The advantageous relative swinging of the plow 14 and tractor 16 permitted by mount 42 is through the pin 60, and its supporting contact with yoke-arms 62 and bar 64. Moreover, the bar 64 is threaded for screw-type connection with a nut 65 secured in the hollow end of the longitudinal support bar 38; this permits both length-adjustment to fit various makes of tractors 16, and the relative rotation of the screw-type connection accommodates rotation of member 38 and thus also swinging of the plow 14 in a vertical transverse plane.

*Height-adjustment by furrow wheel 30*

The furrow wheel 30 (FIG. 2) is journalled on a horizontal axle-forming portion 66 of an L-shaped member 68, the vertical portion providing a support post 70 which extends upwardly for supporting the lateral plow support arm 37, this suporting connection now to be further described.

Post 70 carries a fixed abutment such as stop-ring 72 near its lower end, and above ring 72 the post 70 passes through a collar 74 within which the post 70 is rotatably received. The collar 74 (see FIG. 7) provides an abutment regulating the relative height of the plow 14 and furrow wheel 30, collar 74 being provided on its rear with a lug 76 to which is pinned by pin 77 a link 78, the other end of which is pinned as at 79 to a height-control operating lever 80.

Lever 80, at its lower end, is operatively pinned as by pin 82 to lateral support arm 37, actually to a height-adjustment gear-segment 84 fixed to arm 37; and selectively engageable with the teeth 85 of gear-segment 84 is the inturned finger 86 of a control rod 87 carried by lever 80, the rod 87 being axially movable along lever 80 and spring-pressed by spring 88 into engagement with the teeth 85 of gear-segment 84. An elongated slot 90 (FIG. 8) in lever 80 accommodates movement of finger 86 away from the gear-teeth 85 for height-adjustment.

Thus, height-adjustment of the furrow wheel 30 is effected by the operator raising control rod 87, thus disengaging rod-finger 86 from gear-teeth 85, and swinging lever 80 about pin 82; in such operation, the lever 80 acts through link 78, lug 76 and collar 74, stop-ring 72 and furrow-wheel post 70, to selectively adjust the relative height of furrow wheel 30 and lateral support arm 37 of the plow 14.

Figure 3:
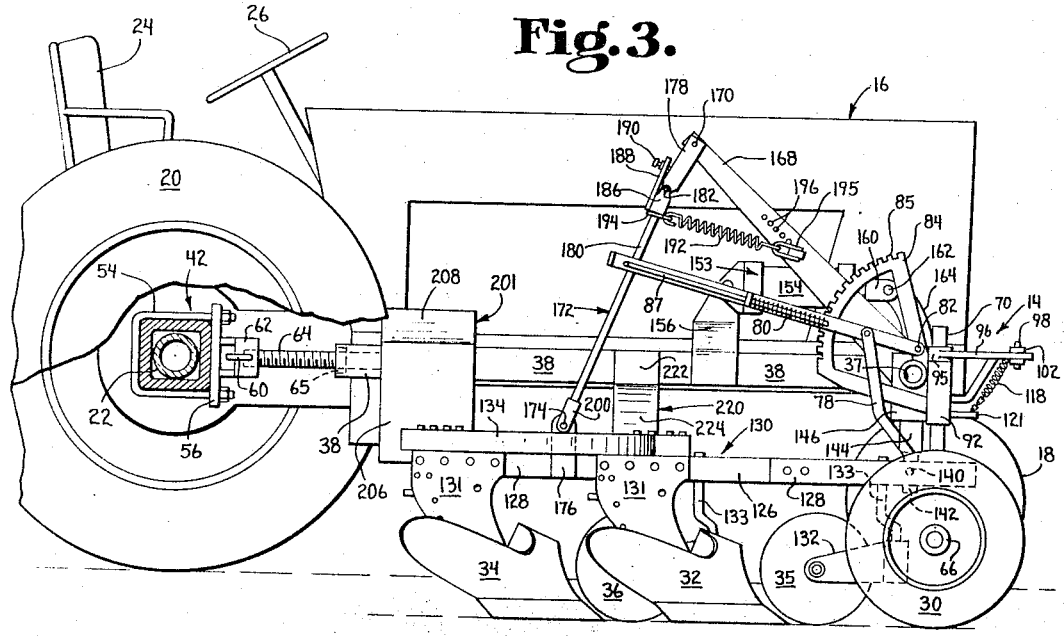
FIG. 3 is a side view thereof, the furrow wheel being shown in a lowered position and the plow assembly being shown in a lowered position with respect to both its front support and its rear support.
Figure 4:
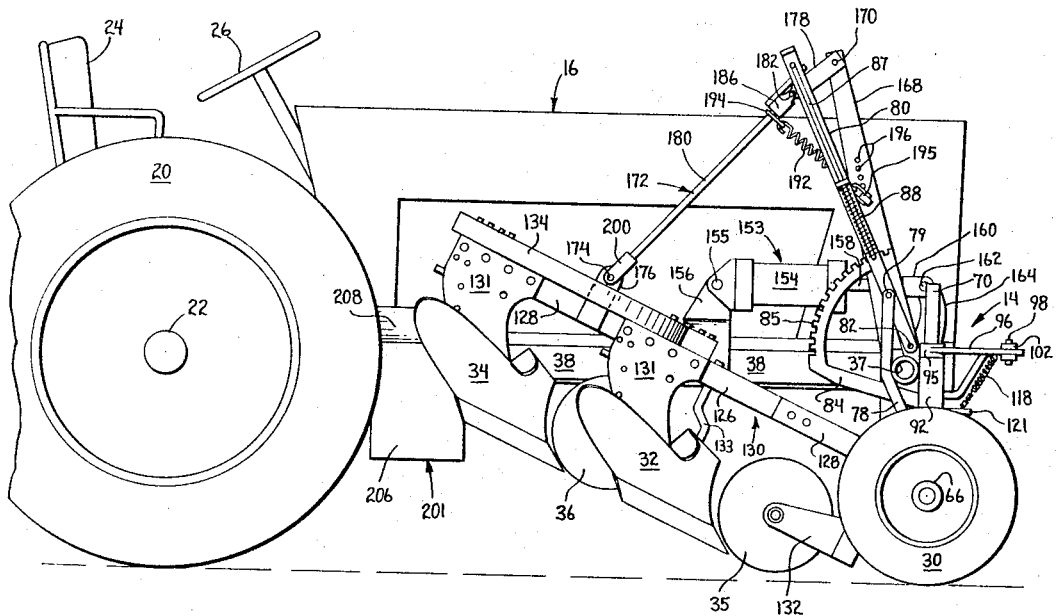
FIG. 4 is a side view similar to FIG. 3, showing the plow assembly in a lowered position with respect to its front support, but in a raised position with respect to its rear support, and with the furrow wheel in a raised position.

This height-adjustment, by furrow wheel 30, is illustrated in FIG. 7, and FIGS. 3 and 4; the relatively lower position of furrow wheel 30 relative to the lateral support arm 37 being shown in FIG. 3 and in the dash-line showing in FIG. 7, and the relatively higher furrow wheel position relative to the lateral support arm 37 is shown in FIG. 4, and in the solid-line showing in FIG. 7.

*Maneuverability of furrow wheel 30*

Returning to FIG. 2, it is noted that the furrow wheel post 70, above the stop-ring 72 and the abutment collar 74 described above, is rotatably received in a vertically-extending collar 92 fixed to lateral plow-support arm 37, collar 92 establishing the location of the axis of the post 70, but providing turnability of the furrow wheel 30. A forwardly-extending angle-iron lug 93 is welded to both arm 37 and collar 92, serving to re-inforce the connection thereof and also to provide a supporting tongue, having holes 94, for auxiliary purposes as desired. The lower arm of gear-segment 84 is also secured to collar 92.

Figure 2:
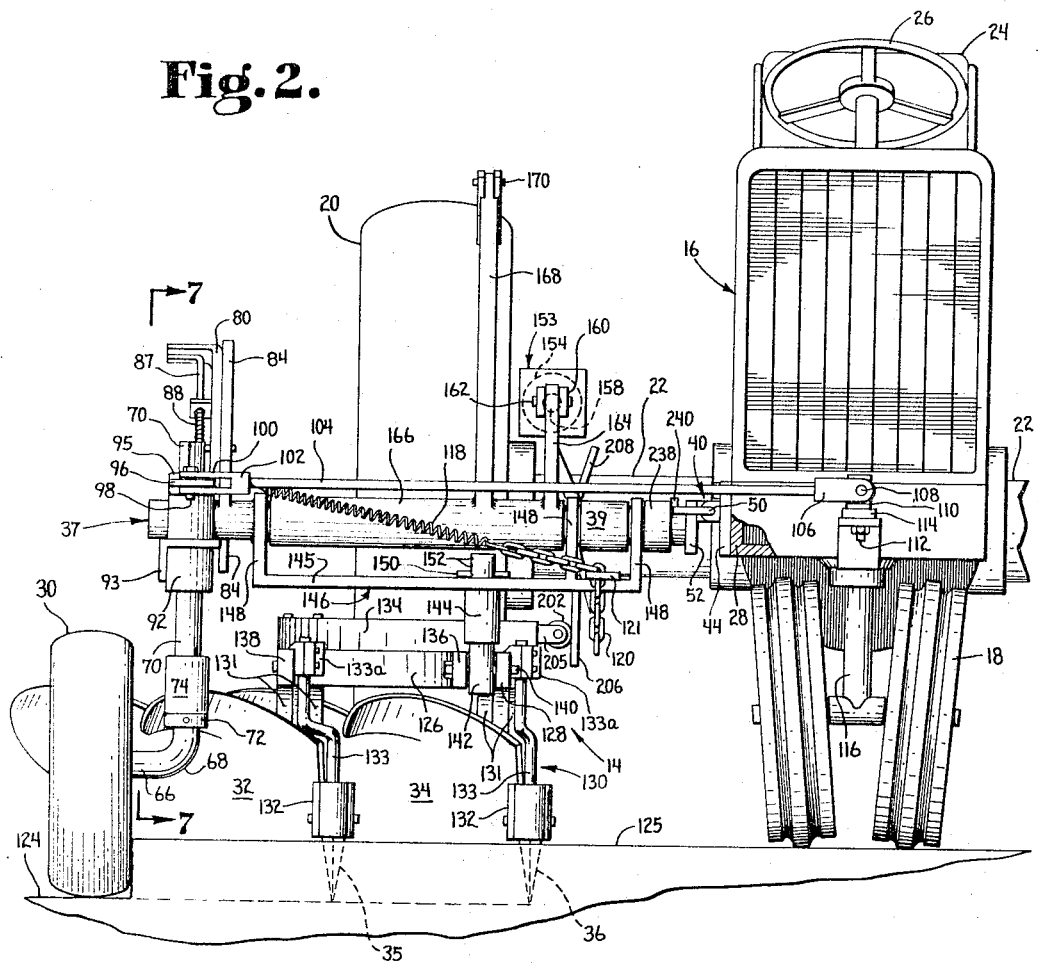
FIG. 2 is a front view thereof.

Above the fixed collar 92, the post 70 is keyed to a rotatable collar 95 from which extends a crank-arm link 96 (FIGS. 1 and 2). This link 96 is pinned by a vertical pin 98 to yoke-arms 100 of a yoke 102 carried on a guide-bar or tie-rod 104 which extends laterally of plow 14; and bar 104, at its other end, carries a yoke 106 pinned by a horizontal pin 108 to a bracket 110, the bracket 110 being pinned by a vertical pin 112 to a crank-arm lever 114 suitably affixed to the vertical steering column 116 of the front tractor-wheels 18.

The direction of furrow wheel 30 is thus co-ordinated with the direction of the front steering wheels 18 of the tractor, providing steerability of the furrow wheel 30, guide advantageous in maneuvering the tractor 16.

Moreover, a tension spring 118 is provided, one end of which is connected as at 119 to a forward portion of crank-arm link 96; and the other end of spring 118 carries a chain 120, connected to a lug 121 fixed (as is yet to be described) to lateral plow-support arm 37, a slot 122 being provided in lug 121 permitting ease of connection and disconnection of the chain 120 and lug 121, with spring-tension being easily adjustable by selective engagement of various links of chain 120 with the slot 122.

This spring 118 exerts a leftward-turning tendency to the furrow wheel 30 (through link 96, collar 95, and wheel-post), causing the furrow wheel 30 to ride against the wall of an already-cut furrow 124; this following tightly against the furrow wall, by furrow wheel 30, acts through guide-bar 104 to cause the tractor front wheels 18 to steer the tractor 16 on the ground 125 on a course parallel to the previously-plowed furrow 124, virtually eliminating the task of steering the tractor by the operator.

*The plow frame assembly 130, in general*

The plow blades 32 and 34, and discs 35 and 36, are carried on frame members 126 and 128, respectively, of a plow frame assembly 130, the blades 32 and 34 being pivotally connected to brackets 131 at the rear of members 126 and 128. Each disc 35 and 36 is carried by a bracket 132 connected to a front portion of frames 126 and 128, respectively, by vertical bent axles 133 and their carrying brackets 133a, thus pivotally connecting the discs 35 and 36 to the plow-frame assembly 130.

The frames 126 and 128 are shown in FIG. 1 as rigidly interconnected by diagonally-extending ties or cross-members, including a rear tie 134, an intermediate tie 135, and a front tie 136. The front tie 136 in the illustrated embodiment is an integral part of frame-member 126, that frame 126 having its forward portion provided by an extension frame-piece 138 rigidly secured to frame 126. Cross-ties 134 and 135 are shown as rigidly bolted to frames 126 and 128; and the connection of tie 136 to frame 128 is now to be described in conjunction with the movable mounting of the forward end of plow frame assembly 130.

It is noted that the outboard ground disc 35 and plow blade 32 are forward of the inboard disc 36 and plow blade 34, all four of those members (32, 34, 35, and 36) being rearward of lateral frame-arm 37, although outboard disc 35 is closely adjacent the lateral arm 37.

*Front mounting of plow frame assembly 130*

At its forward end, plow frame assembly 130 is supportingly but movable connected to main lateral support arm 37 as follows: Frame member 128 and member 136 of frame member 126 are pinned by a horizontal pin 140 to a vertical supporting rod 142 (see FIGS. 2, 5, and 10) which is rotatably received by a collar 144 welded to the horizontal member 145 of a laterally-extending three-arm yoke 146 whose arms 148 are welded to main lateral support arm 37. A holding pin 150 extends through a selected one of rod-holes 152, above yoke-member 146, to support the rod 142.

The horizontal-axis-pivoting at pin 140 permits lifting of the plow assembly 130 in a vertical longitudinal plane (other details concerning which are yet to be described); and rotatability of supporting rod 142 in collar 144 permits the plow assembly 130 to pivot, thus facilitating the making of round corners by permitting lateral movement of the plow assembly 130 relative to the tractor 16.

(The yoke-plate 145 of yoke 146 serves also as a mount for the lug 121, mentioned above, to which the steering-tension spring 118 is connected; and the two inboard yoke-arms 148 axially fix the collar 39 of main longitudinal frame member 38 to lateral support arm 37.)

*Lifting of plow assembly 130*

A hydraulic means 153 is provided (FIGS. 3, 4, 5, and 10), which includes a power cylinder 154 supportingly pinned at 155 at its rear to an offset bracket 156 fixed to main longitudinal support frame-arm 38, and including a forwardly-extending power piston rod 158. This power means 153 provides for lifting the plow assembly 130, as follows: The piston rod 158 carries a yoke 160 which is pinned by pin 162 to a crank-link 164. The crank-link 164 is fixed to a laterally-extending cylindrical collar 166 (FIGS. 1 and 2) rotatably received on the main lateral plow-support arm 37; and the rear of plow assembly 130 is also supportingly connected to the collar 166, as now to be described, to utilize the power of the hydraulic cylinder 154 effective through the collar 166.

Supporting the rear of plow assembly 130, a long crank-link 168 is also connected to collar 166, the crank-link 168 extending upwardly and rearwardly from the collar 166. At the end of crank-link 168 opposite collar 166, the crank-link 168 is pinned as at 170 to a connecting linkage generally designated by numeral 172 (details of which are yet to be described) which is pinned as at 174 to a bracket 176 fixed to plow-frame 128 of the plow assembly 130.

Thus, lifting or lowering of the plow frame assembly 130, the power and control being supplied by hydraulic cylinder 154, is through collar 166, crank-link 168, and linkage 172, to act through bracket 176 to the rear portion of the plow frame assembly 130. Pivoting of the front portion of the frame, by the pin 140 described above, permits this swinging of the frame assembly 130 in this raising or lowering thereof.

Figure 5:
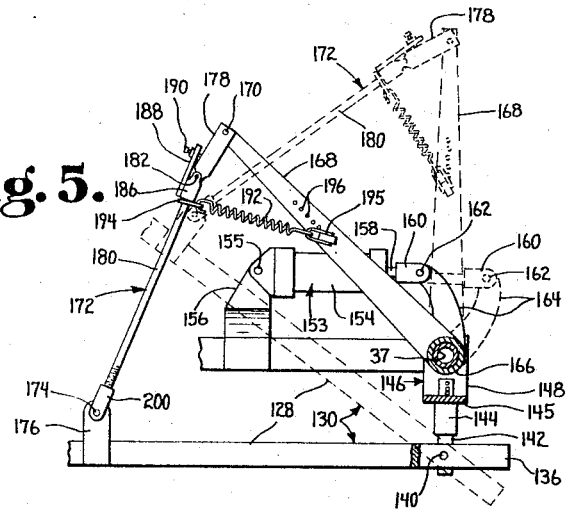
FIG. 5 is a view taken generally along section-line 5—5 of FIG. 1 illustrating means for adjustably supporting the rear of the plow frame assembly from the framing.

This vertical-plane swinging of plow-frame assembly 130, powered and controlled by hydraulic means 153, is illustrated in FIG. 5, and in FIGS. 3 and 4; the lowered position of frame assembly 130 being shown in FIG. 3, and by the solid-line showing in FIG. 5, and the raised position of assembly 130 being shown in FIG. 4, and by the dash-line showing in FIG. 5.

*Release of plow assembly 130, upon encountering obstruction*

The plow-control linkage 172, which lifts the plow assembly 130 by hydraulic means 153 described above, is comprised of links 178 and 180 pinned as at 182 to permit breaking or buckling of the linkage 172 if the plow blades 32 or 34 encounter undue obstructions.

Figure 10:
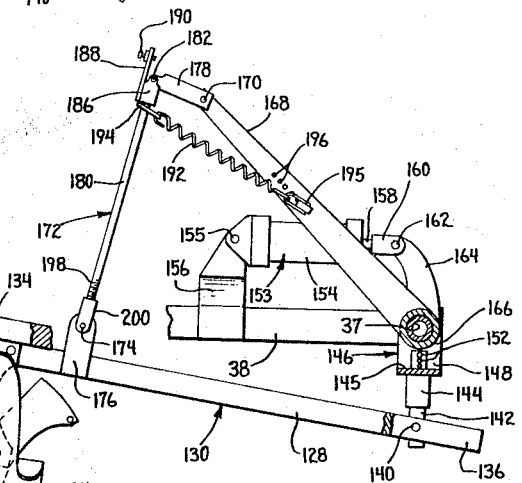
FIG. 10 is a view similar to FIG. 5, but illustrating the concepts permitting linkage-collapse when the plow blade encounters an undue obstruction.

Such an encountering of an obstruction is illustrated in FIG. 10, where the plow-blade 34 is shown hitting a rock 184, and the pivoting of blade 34 with respect to blade-bracket 131 is not sufficient to permit the blade 34 to pass by the rock 184.

As is there apparent, the upward component of the obstruction reaction-force is transmitted through blade 34 and bracket 131 to the plow frame 128 of frame assembly 130. This upward force is exerted upwardly through link 180.

However, even in the most-straightened condition of links 180 and 178, as shown in FIGS. 3, 4, and 5, links 180 and 178 are not axially aligned; thus no undue compressive force can be sustained by the linkage 172, for the links 180 and 178 pivot about their common pin 182 and about pins 170 and 174 to provide a collapse or shortening of linkage 172, accommodating a relatively unrestrained raising of the plow assembly 130 relative to the power crank-link 168 and other parts.

Assuring that links 178 and 180 will not be axially aligned (the non-alignment permitting linkage-collapse just described), the yoke 186 carried at the upper end of link 180 carries a tongue 188; and the tongue carries an adjustable abutment screw 190 adapted to engage link 178, the screw 190 being adjusted to bear against link 178 an amount to achieve and maintain the desired misalignment.

Premature link-collapse of linkage 172 is prevented by a spring 192, the rear end of which is hooked over link 180 as at 194, and the front end 195 of which is selectively engaged into a desired one of holes 196 on crank-link 168 to set the tension as desired.

Re-straightening of the linkage 172 is assisted by the added stress in tension spring 192 existing when the linkage 172 has been collapsed.

Adjustment of the effective length of linkage 172 is provided by a screw-adjustment 198 of link 180 with respect to its yoke 200 which is carried by link 180 to receive the pin 174.

*Abutment means 201, between frame 38 and plow-assembly 130*

Figure 6:
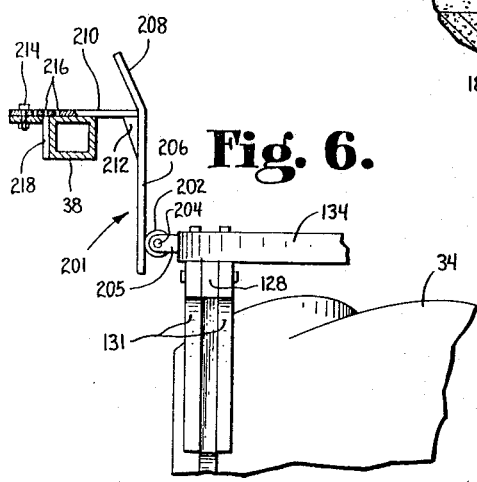
FIG. 6 is a view taken generally along section-line 6—6 of FIG. 1, illustrating abutment means.

FIGS. 1 and 6 illustrate advantageous abutment means 201 operative between the main longitudinal support frame 38 and the plow frame assembly 130. As shown the plow frame assembly 130 (actually an extension of cross-tie 134 thereof) carries a longitudinally-extending roller 202 held by a horizontal pin 204, the roller 202 and pin 204 being carried on a bracket 205 on the side of the plow frame assembly 130 nearest the main frame 38 and the tractor. Co-operating with roller 202, the main frame 38 is provided with a vertical deflector plate 206 engageable by roller 202, preventing the plow frame assembly 130 from swinging into the main frame 38 when a lateral force swings the plow frame assembly 130 (which pivots at 142–144) toward the tractor.

Abutment plate 206 (FIG. 6) is provided with an upper portion 208 which is inclined, extending upwardly and toward the tractor. This bent or otherwise-formed upper plate-portion 208 is engaged by the roller 202 as the plow frame assembly 130 is being lowered, as from the latter's raised (FIG. 4) position to its lowered (FIG. 3) position, if the plow assembly 130 happens to be swung that far toward the tractor while raised; and during lowering of the plow assembly 130, the inclined portion 208 cams or deflects the plow assembly 130 away from main longitudinal frame 38 and into a position where roller 202 will operatively engage abutment plate 206.

For supporting the plate 206 of abutment means 201 (FIG. 6), the plate 206 is shown as held by a horizontal plate 210, the connection supported by gusset plate 212. Plate 210 overlies frame 38, and is bolted as by bolt 214 extending through a selected one of adjustment holes 216 in an angle member 218 welded to frame 38.

*Protection of disc 36: deflecting means 220*

Figure 9:
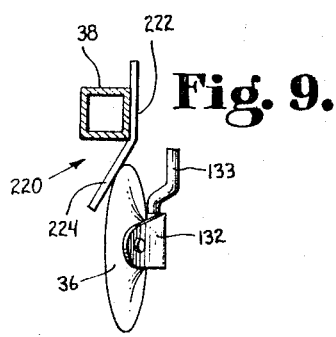
FIG. 9 is a detail cross-sectional view, taken generally along section-line 9—9 of FIG. 1.

FIG. 9 illustrates deflecting means 220 for protecting ground-disc 36. As there shown, main longitudinal frame member 38 is provided with a deflector plate 222, a lower portion 224 of which is inclined downwardly and toward the tractor.

This bent or otherwise-formed lower portion 224 is engageable by the disc 36 as the plow frame assembly 130 is being raised, as from the latter's lowered (FIG. 3) position to its raised (FIG. 4) position, if, similar to the condition protected by abutment means 201 described above, the plow assembly 130 happens to be swung (about the axes of rod 142 and collar 144) that far toward the tractor while in lowered position.

*Support of plow 14 when not assembled onto tractor*

Front and rear supporting legs 226 and 228, respectively, are shown carried by main longitudinal frame-member 38, which support the tractor-side of the plow 14 when the plow is not connected to the tractor by the mounts 40 and 42 described above; and the legs are movable to a retracted position along the plow-framing when the plow is mounted on the tractor.

Front leg 226 is shown as provided by a jack of automotive type, having a base 230 carried by a lower column-member 232, the latter carrying an extension column 234 the extension of which is controlled by a suitable lifting means or operating ratchet diagrammatically indicated by numeral 236. The top of extension member 234 is affixed to a collar 238 which rotatably surrounds main lateral arm 37, between the most inboard of yoke-arms 148 and an abutment screw or pin 240, the latter two members locating the collar 238 of jack 226 axially along arm 37. Front-jack 226 is held in upraised condition by a clip 242 affixed to longitudinal frame-member 38.

Rear leg 228 is illustrated by a column-member 224 provided at its foot with a base 246, and slidable in a bracket 248, the bracket being swingable in a vertical, longitudinal plane around a supporting pin 250 secured to frame-member 38. A holding screw 252 maintains the adjustment of leg 244 in bracket 248; and a clip 254 secured to frame-member 38 holds leg 228 in upraised condition when not needed for supporting the plow.

*Conclusion*

From the foregoing, it will be seen that the concepts of the present invention provide a new and useful front-mounted plow for a tractor, having several features and advantages, including: movable mounting of the frame by easily-attached mounting means; directional turnability of the furrow-wheel; steering guidance by the furrow-wheel during tracking; movability of the plow frame assembly with respect to the plow framing; power control and lifting of the plow assembly; accommodation of undue obstructions by linkage-collapse to permit plow-blade raising; height-adjustment of the furrow wheel; height-adjustment of the front support of the plow assembly; ease of turning; retractable supports for the plow when not mounted onto a tractor; advantageous plow arrangement and flexibility by providing an effective front-mounted plow for use in combination with a rear-mounted plow or plows; adjustability of several components to achieve the desired plowing effect considering particular environmental conditions; adjustability to accommodate various makes and types of tractors. These and others provide, in the overall, a useful and advantageous front-mounted plow.

Accordingly, from the foregoing description of the invention according to the illustrated embodiments, considered with the accompanying drawings, it is seen that the invention provides a novel and useful device having desirable advantages and characteristics, and accomplishing its intended objects, including those hereinbefore pointed out and others which are inherent in the invention.

It will be understood that modifications and variations may be effected without departing from the scope of the novel concepts of the invention; accordingly, it is to be understood that the invention is not limited to the specific embodiment thereof illustrated and described, or to the specific form or arrangement herein described and shown.

What is claimed is:
1. A plow mountable on an associated vehicle, comprising:
   plow framing;
   a supporting wheel means;
   said supporting wheel means being movably connected to said framing permitting directional turning of said supporting wheel means with respect to said framing;
   a relatively forward mounting of said framing on said vehicle;
   a relatively rearward mounting of said framing on said vehicle;
   the said forward mounting permitting movement of said framing in a vertical transverse plane;
   the said rearward mounting permitting movement of said framing in a vertical transverse plane and a vertical longitudinal plane;
   a plow assembly movably connected to said framing;
   the plow-assembly being swingable vertically and laterally with respect to the framing;
   power means operatively interconnecting said framing and said plow assembly for varying the relative height thereof;
   said power means including a collapsible linkage accommodating a raising of said plow assembly with respect to said framing upon the encountering by the plow of an undue obstruction;
   wheel-height adjustment means operatively interconnecting said supporting wheel means and said framing, and operative to adjust the relative height thereof;
   supporting means for supporting the plow when it is not mounted on the vehicle, said supporting means including relatively forward and relatively rearward supporting legs movably associated with the plow framing and movable between a ground-engaging plow-supporting position and a retracted position above the ground when the plow is mounted on the vehicle;
   means operatively linking the supporting wheel means with the associated guide means of the associated vehicle;
   means biasing said supporting wheel means toward the wall of the furrow previously cut.
2. A plow in accord with claim 1 wherein;
   said biasing means includes a spring means operatively connected to said supporting wheel means and to said framing;
   said spring means including a spring and a chain, there being provided a chain-retaining means operatively carried by said framing and provided with a narrow opening means retainingly engageable with a link of said chain.
3. A plow in accord with claim 2 wherein said supporting wheel means additionally includes a vertical support member;
   an abutment operatively fixed on said support member;
   an abutment associated with but axially movable with respect to said support member above said fixed abutment but abuttingly engageable therewith;
   means carried by the framing fixing the location of the axis of said support member but permitting movement of said support member in an axial direction;
   adjustable spacing means operatively connected to said framing and said associated abutment regulating the relative height of said framing and said associated abutment and thus also the relative height of said framing and said supporting wheel means;
   said support member being a shaft, and said associated abutment being a collar which rotatably receives said shaft;
   the said shaft being rotatable with respect to said framing, permitting directional turning of said supporting wheel means;
   means operatively connected to said shaft and to the associated guide means of the associated vehicle, co-ordinating the direction of said associated guide means and said supporting wheel means.
4. A plow in accord with claim 1 wherein said plow framing comprises:
   a laterally-extending frame member;
   a longitudinally-extending frame member, the rear end of which is supportingly connected to the rear axle of the tractor;
   the laterally-extending frame member being supportingly connected to a forward portion of the tractor;
   the longitudinally-extending frame member being supportingly connected to the laterally-extending frame member at a location therealong spaced from the connection of said laterally-extending frame member to the tractor;
   all of said connections being movable to permit said laterally-extending frame member to move vertically with respect to the tractor;
   a plow assembly wholly supported by said laterally-extending frame member, rearwardly thereof, but movably related thereto;
   said assembly being movably both laterally and vertically with respect to said laterally-extending frame member.
5. A plow in accord with claim 1 wherein said plow framing comprises:
   a laterally-extending frame member;
   a longitudinally-extending frame member, the rear end of which is supportingly connected to the rear axle of the tractor;

the laterally-extending frame member being supportingly connected to a forward portion of the tractor;

the longitudinally - extending frame member being supportingly connected to the laterally-extending frame member at a location therealong spaced from the connection of said laterally-extending frame member to the tractor;

all of said connections being movable to permit said laterally-extending frame member to move vertically with respect to the tractor;

a plow assembly wholly supported by said laterally-extending frame member, rearwardly thereof, but movably related thereto.

6. A plow mountable on an associated vehicle, comprising:

plow framing;

a plow assembly operatively connected to said framing;

the said connection permitting lateral swinging of the said plow assembly with respect to said framing, and permitting also vertical moving of the plow assembly with respect to the framing;

roller and plate abutment means carried by said plow assembly and said framing maintaining a lateral spacing relationship thereof even though they move relatively vertically;

abutment means co-operatively provided by said plow-assembly and framing maintaining a lateral spacing relationship thereof even though they move relatively vertically, the abutment means including an inclined member which relatively deflects the members to the desired lateral spacing relationship during relative vertical movement thereof.

7. A plow in accord with claim 6 wherein said plow framing includes a lateral arm;

a collar loosely receiving said arm;

said plow assembly operatively connected to said arm for vertical movement with respect thereto;

means interconnecting said collar and said plow assembly;

height-control means for rotating said collar to thereby move said plow assembly with respect to the framing.

8. A plow in accord with claim 7 additionally comprising:

a supporting wheel;

a front and a rear support means for the plow assembly;

the framing additionally including longitudinal frame means;

the laterally-extending arm supporting all of the following: the longitudinal frame means; the plow assembly front support; the plow-assembly rear support; and the supporting wheel.

9. A plow in accord with claim 8 wherein:

the plow framing includes a longitudinally-extending threaded shaft supportingly connected to said vehicle and threadedly connected to another portion of the framing, the threaded connection permitting length adjustment of the effective length of the framing and relative rotation of the said other portion of the framing with respect to the vehicle;

the said supporting connection including means permitting the threaded shaft to move in a vertical longitudinal plane and thus also permit movement of the said other portion of the framing to move in a vertical longitudinal plane;

means supporting the framing by the vehicle at another location of the framing and permitting relative movement of the framing and the vehicle by movement of the framing in a vertical transverse plane.

References Cited

UNITED STATES PATENTS

| | | | |
|---|---|---|---|
| 1,112,215 | 9/1914 | Jordan et al. | 172—322 |
| 1,294,235 | 2/1919 | Christiansen | 172—242 X |
| 1,476,738 | 12/1923 | Taylor | 172—280 X |
| 1,644,970 | 10/1927 | Wilson | 172—667 |
| 1,873,749 | 8/1932 | Flanangan | 172—308 X |
| 2,063,051 | 12/1936 | Ray | 172—274 X |
| 2,092,609 | 9/1937 | Morkovski | 172—303 |
| 2,151,117 | 3/1939 | Kepler | 172—418 |
| 2,179,793 | 11/1939 | Lewison | 172—276 X |
| 2,630,745 | 3/1953 | Flippin | 172—280 |
| 2,672,803 | 3/1954 | Silver et al. | 172—280 |
| 2,701,994 | 2/1955 | Jennings | 172—266 |
| 2,961,054 | 11/1960 | Green | 172—305 |

FOREIGN PATENTS

| | | |
|---|---|---|
| 227,030 | 2/1960 | Australia. |
| 220,864 | 4/1962 | Austria. |
| 547,719 | 10/1957 | Canada. |
| 333,028 | 2/1921 | Germany. |

ABRAHAM G. STONE, *Primary Examiner.*

J. R. OAKS, *Assistant Examiner.*